Feb. 1, 1966 K. F. BLÖSS 3,232,412
APPARATUS FOR BRINGING INTO UPRIGHT BELLY-DOSAL POSITION FISH
TRANSPORTED RESTING ON ONE SIDE
Filed Feb. 28, 1963
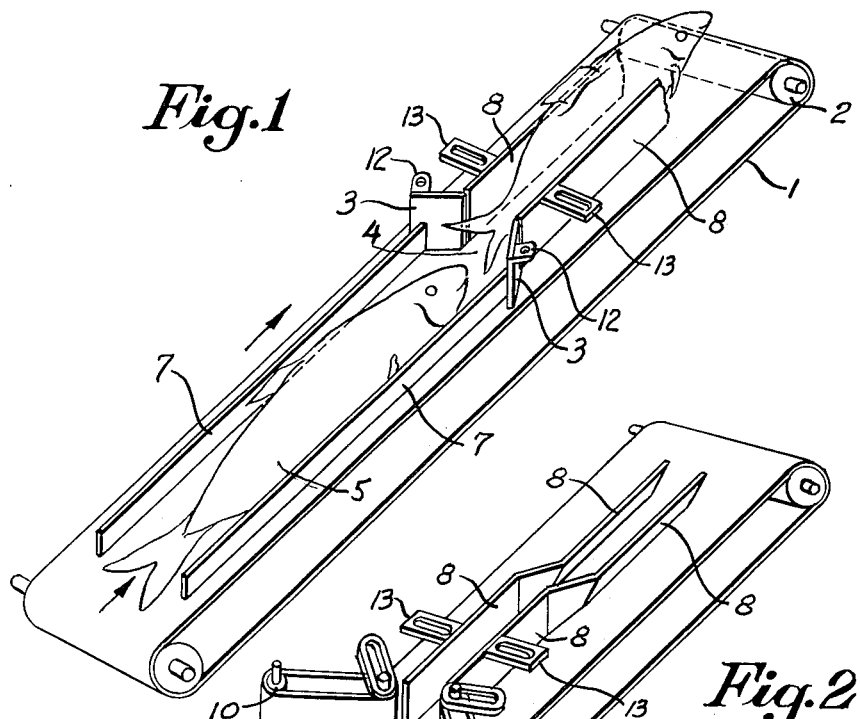
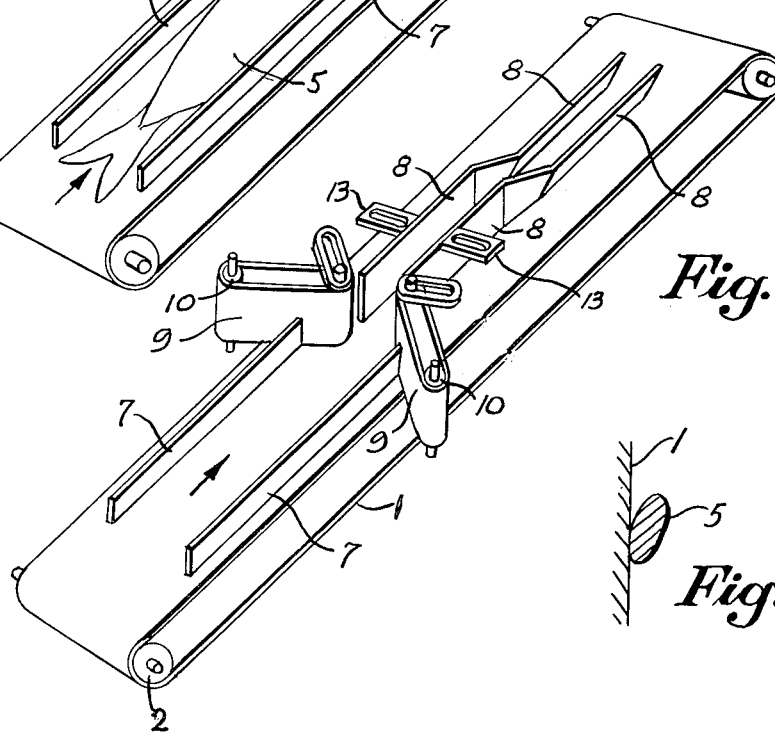
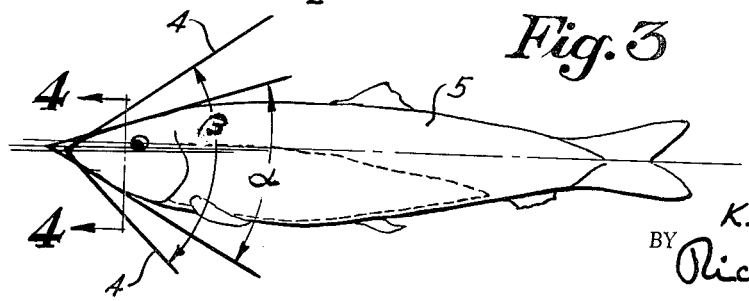
INVENTOR.
K. F. BLÖSS
BY Richards & Geier
ATTORNEYS 3,232,412
APPARATUS FOR BRINGING INTO UPRIGHT BELLY-DOSAL POSITION FISH TRANSPORTED RESTING ON ONE SIDE
Karl Friedrich Blöss, Steinhorst uber Bad Oldesloe, Schleswig-Holstein, Germany, assignor to Nordischer Maschinenbau Rud. Baader, Lubeck, Germany, a firm
Filed Feb. 28, 1963, Ser. No. 261,897
Claims priority, application Germany, Mar. 3, 1962, N 21,295
5 Claims. (Cl. 198—33)

The invention relates to an apparatus for bringing into upright belly-dosal position fish transported resting on one side, comprising a belt-like conveyor on which the fish are carried head foremost and two guide surfaces arranged above the conveyor. The object of the invention is to improve the efficiency of apparatus of this type. Extensive mechanisation of the industry has become possible by developing machines for almost all operations in the preparation of fish. In spite of many attempts, automatic introduction and feeding on the dressing machines has not, however, been possible up to the present because all positioning operations necessary for this purpose could not be carried out with sufficient reliability. A difficult problem is the positioning of fish in upright belly-dosal position. To solve this problem numerous arrangements have been proposed but none of them have been satisfactory. In particular, it has been endeavoured with the aid of troughs with varying cross-section, to bring the fish sliding head foremost, on to its back. As in this operation the centre of gravity displaced towards the back is used and the directing moment available thereby is small, this arrangement could not be successful if additional frictional forces occur on the fish during the deformation or damage thereof. Characteristic to these directing elements is that the angle between the guide surfaces is more acute than the head angle of the fish. Another disadvantage of these arrangements is that, due to the different sliding behaviour of the fish, depending upon their condition (with more or fewer scales, fresh or soft etc.), an undisturbed continuous flow of fish cannot be attained and blockages occur repeatedly.

It has now been found that a fish transported resting on its side can be reliably brought into upright position resting on its belly if the head moving in advances is guided against a pair of guide surfaces arranged just above the conveyor belt and including an angle which is greater than the head angle of the fish. The bringing of the fish into upright position by these guide surfaces is no longer dependent upon the frictional forces but is a mechanically controlled operation because it is merely dependent upon the shape of the head of the fish. All fish, the head shape of which in cross-section is broader at the top of the skull than at the lower jaw, and in which therefore, when resting on one side, the symmetry axis of the head portion located in front of the eyes is inclined to the lower jaw, can be brought to stand on the belly.

To maintain the fish exactly in rhythm with the feed movement and to overcome any resistances which may occur, it is advisable to construct these guide surfaces as transporting surfaces, that is to use, for example, the strands of two flat belts as guide surfaces. Furthermore, it may also be advisable to allow these belts to run quicker than the lower conveyor belt. Although adaptation to the different sizesz and kinds of fish is not necessary for the positioning operation, it may nevertheless be advantageous, in order to make the range of operation of the apparatus as wide as possible. Such adaptation can easily be attained by making the guide surfaces adjustable as regards their angular position in relation to each other and/or the size of the passage gap.

To facilitate the guiding of the fish, guides are preferably provided above the conveyor belt in front of the guide surfaces, for guiding the belly and back of the fish, and similar guides following the guide surfaces, for supporting the belly of the fish. These guides may consist of sheet metal or plastic walls. By inclining the pair of walls following the guiding surfaces, the fish can always be brought to rest on the proper side when the subsequent operation is to be carried out with the fish on its side.

It is evident that it is also possible to arrange the working tools, for example the belly trimming blade, head blade or the like, at the outlet of the gap between the guiding surfaces.

Two embodiments of the invention are illustrated diagrammatically by way of example in the accompanying drawing, in which FIG. 1 is a perspective view of the apparatus with stationary or rigid guide surfaces;

FIG. 2 a perspective view of the apparatus with transporting guide surfaces;

FIG. 3 a view of a fish resting on its side showing the head angle and the angle of the guiding surfaces, and FIG. 4 a section taken on line IV–IV of FIG. 3.

In the apparatus illustrated in FIGS. 1 and 2 only the parts necessary for understanding the invention are shown. All other parts, such as drives and so forth, are the same as those in the known machines.

In FIG. 1, 1 designates an endless conveyor belt running over driving rollers 2 and of a length to meet the actual requirements. Directly above the conveyor belt 1 guide surfaces 3 stand at an angle to each other and include in the vertex of the angle a passage 4. As can be seen from the fish 5 resting on its side, the angle formed by the guide surfaces 3 is greater than the head angle of the fish. This is shown still more clearly in the plan view in FIG. 3 where it can be seen that the head angle of the fish 5 is smaller than the angle between the guide surfaces 3. FIG. 4 shows that when the fish is resting on its side the symmetry axis of the head portion located in front of the eyes to the lower jaw is inclined.

The angle included by the guide surfaces and/or the size of the passage gap can be adjusted by any suitable adjusting device 13.

The apparatus functions in the following manner:

The head of the fish 5 resting on the conveyor belt 1 comes into contact with the guide surfaces 3. These guide surfaces 3 force the head and consequently the whole fish, due to the inclined symmetry axis, into upright position resting on the belly as in the case of the fish 6 in FIG. 1. In this position it can easily pass through the passage 4. To facilitate the feeding of the fish to the guide surfaces 3, lateral guides 7 are provided in front of the guiding surfaces 3 so that the fish is already centered on reaching the guide surfaces 3. Following the passage 4 guides 8 may also be provided to maintain the fish in upright position resting on its belly. These guides are obviously not necessary when the fish is worked immediately it passes out from the passage 4.

In the apparatus illustrated in FIG. 2, the parts 1, 2, 7 and 8 are the same as in the apparatus shown in FIG. 1. Only the rigid guide surfaces are replaced by moving guide surfaces, which in the example illustrated are formed by endless belts 9 running over driving rollers 10. The operation of this embodiment is the same as that of the embodiment shown in FIG. 1, only the moving guide surfaces 9 facilitate the bringing of the fish on to its belly. The guides 8 are inclined relatively to their base surface in the direction in which the fish is to be turned.

What I claim is:

1. Apparatus for moving into an upright belly-dosal position fish which are transported while resting on one side, said apparatus comprising a belt-like conveying device, two guide surfaces located directly above said conveying device and extending at an angle which is greater than the head angle of the fish, the vortex of said angle having a gap for the passage of the fish resting on its belly, lateral guides located above said conveying device in front of said guide surfaces for guiding the fish on its side and other guides which follow the passage formed by said gap for guiding the fish resting on its belly, wherein the guides following the passage for turning the fish resting on its belly on to the predetermined side are inclined to that side relatively to their base surface.

2. Apparatus according to claim 1, wherein the angle included by the guide surfaces and the size of the passage gap are adjustable.

3. Apparatus according to claim 1, wherein the guide surfaces are constructed as conveying surfaces.

4. Apparatus according to claim 3, wherein the guide surfaces are parts of conveyor belts.

5. Apparatus according to claim 3, wherein the conveying guide surfaces run at a higher speed than the conveying device carrying the fish.

References Cited by the Examiner

UNITED STATES PATENTS 2,970,360  2/1961  Cabell _____ 198—33.3

FOREIGN PATENTS 566,841  12/1958  Germany.

SAMUEL F. COLEMAN, *Primary Examiner.*

ERNEST A. FALLER, *Examiner.*